United States Patent [19]

Holt et al.

[11] Patent Number: 4,536,375
[45] Date of Patent: Aug. 20, 1985

[54] PURIFICATION OF GASES

[75] Inventors: Andrew Holt, Enfield; David W. White, Radlett, both of England

[73] Assignee: M.P. United Drug Company Limited, England

[21] Appl. No.: 543,075

[22] Filed: Oct. 18, 1983

[30] Foreign Application Priority Data

Oct. 18, 1982 [GB] United Kingdom ................ 8229655
Mar. 7, 1983 [GB] United Kingdom ................ 8306168

[51] Int. Cl.³ ............................................. B01D 53/36
[52] U.S. Cl. .................................... 423/247; 502/352
[58] Field of Search ............... 423/230, 247, 246, 245, 423/437; 502/73, 74, 352

[56] References Cited

U.S. PATENT DOCUMENTS 3,216,783 11/1965 Cohn ..................................... 423/247
4,117,082 9/1978 Matsuyama ........................... 423/247
4,191,733 3/1980 Swift et al. ........................... 423/245
4,317,460 3/1982 Dale et al. ......................... 423/247 X Primary Examiner—Earl C. Thomas
Attorney, Agent, or Firm—Lerner, David, Littenberg, Krumholz & Mentlik

[57] ABSTRACT

A carbon monoxide-contaminated breathable gas (that is a gas or gas mixture containing sufficient oxygen to support human life) is purified by bringing it into contact with a bed of a catalyst, whereby to oxidize carbon monoxide to carbon dioxide and reduce the carbon monoxide contamination of gas, the catalyst being a promoted tin IV oxide-support precious metal catalyst in which the promoter is one or more metals of group 1b, 3b, 7bb and 8 of the Periodic Table (especially copper, nickel, manganese, silica or lanthanum) and the precious metal is platinum, palladium, rhodium, iridium or ruthenium.

9 Claims, No Drawings

PURIFICATION OF GASES

This invention is concerned with improvements in and relating to the purification of contaminated breathable gases and, in particular, is concerned with the purification of breathable gases to reduce carbon monoxide contamination thereof.

Breathable gases are, of course, essential to the support of human life and the term "breathable gas" as used herein is intended to refer to a gas or gas mixture containing oxygen in sufficient amounts to support human life. Thus, whilst the term may refer to oxygen per se it may also refer to mixtures of oxygen with inert gases such as nitrogen (for example as atmospheric air) or helium, for example as so-called "heliox" gas mixtures such as are used in underwater breathing systems.

Carbon monoxide is an important potential contaminant of breathable gases since it is toxic or narcotic in relatively low concentrations, especially when the gas contaminated with the carbon monoxide is to be breathed for any appreciable period of time, e.g. a few minutes or more.

Breathable gases may be contaminated with carbon monoxide in the event of fires and/or explosions as well as the result of operations involving combustion such as welding operations.

It has now been found, in accordance with the present invention, that the carbon monoxide content of a carbon monoxide-contaminated breathable gas may be reduced by passing the gas over a promoted tin IV oxide-supported precious metal catalyst as hereinafter defined.

According to the invention, therefore, there is provided a method of reducing the carbon monoxide content of a breathable gas contaminated with carbon monoxide which comprises bringing the contaminated gas into contact with a body of a catalyst, whereby to oxidise carbon monoxide in the contaminated gas to carbon dioxide, in which the catalyst comprises a promoted tin IV oxide-supported precious metal catalyst, the promoter being one or more metals of groups 1b, 3b, 7b and 8 of the Periodic Table (especially copper, nickel, manganese, silver or lanthanum) and the precious metal being platinum, palladium, rhodium, iridium or ruthenium. The Periodic Table herein referred to is that published in the "Chemical Encyclopedia Handbook".

The method of the invention has the advantage that oxidation of the carbon monoxide in the contaminated gas may be effected, without supplying external heat to the gas, at ambient or sub-ambient temperatures, e.g. at temperatures of 0° to 40° C.

The cataylst used in the invention is a promoted tin IV oxide-supported precious metal catalyst, that is it comprises a promoted tin IV oxide ($SnO_2$) having deposited thereon one or more precious metals as noted above.

The promoter for the tin IV oxide support is preferably copper, nickel, manganese, silver or lanthanum and of these nickel and manganese are the more generally preferred promoters. The promoter, or promoters, are preferably present in an amount of from 0.1 to 5% by weight, based on the weight of the tin IV oxide support, preferably in an amount of from 0.2 to 2% by weight, more preferably 0.3 to 0.8% by weight, on the same basis. The tin IV oxide support may contain small amounts of tin II oxide, e.g. up to about 1% by weight of tin II oxide.

The precious metal component of the catalyst comprises one or more of platinum, palladium, rhodium, irridium and ruthenium and each of these may be present in an amount of up to 5% by weight, to a total of 1 to 10% by weight of precious metal, based on the weight of the tin IV oxide support. Preferred precious metals are platinum and palladium and these are suitably employed in an amount of from 0.5 to 5% by weight based on the weight of the tin IV oxide support. An especially preferred catalyst comprises a mixture of platinum and palladium as precious metal component, preferably in a total of from 3 to 5% by weight, based on the weight of tin IV oxide support.

The promoted tin IV oxide supporting the precious metal may itself be supported on an inert catalyst support material. Suitable catalyst support materials include alumina and magnesia and alumina- and magnesia-based ceramic materials.

The catalyst itself, whether or not including an inert catalyst support material, may take the form of shaped particles, especially cylindrical particles formed by extruding the catalyst materials and cutting the resultant extrudate into short pieces. In another embodiment, especially when supported on an inert catalyst support, the catalyst may take the form of a so-called "honeycomb" structure, i.e. a block of material having a plurality of longitudinal bores or passages extending through the block.

The catalyst used in the method of the invention may be prepared by the basis steps of forming a calcined body of tin IV oxide containing the promoter and precious metal component in the form of their oxides and then reducing these to their metallic form, for example by reaction with hydrazine hydrate.

The calcined body of tin IV oxide containing the appropriate other metal oxides may be prepared by simply calcining a mixture of tin IV oxide and the metal oxides (or precursors therefor capable of being converted to the oxides on calcining). It is, however, generally preferred to first form a body of calcined tin IV oxide containing the promoter in oxide form and impregnate this with an aqueous solution of a precursor for the precious metal oxide and then calcine the impregnated body. The body of calcined tin IV may simply be prepared from a mixture of tin IV oxide and promoter oxide but is preferably prepared by impregnating a calcined body of tin IV oxide with an aqueous solution of a precursor for the promoter oxide and then calcining the impregnated body.

The method of the invention may be used to purify carbon monoxide-contaminated breathable gases in a variety of applications. Thus, for example, it may be used to purify gases in portable breathing apparatus or in fixed installations for the purification of gases in closed environments such as hyperbaric chambers.

The oxidation of carbon monoxide to carbon dioxide is, of course, an exothermic reaction and thus air passing over the catalyst bed may be heated. This may be a problem if the gas has a high moisture content in which event the water vapour in the gas may be heated to an extent sufficient to scald the throat of a person inhaling the gas directly from the bed, as in a portable breathing apparatus. In this case, it is often desirable to at least partially dry the gas before it passes over the catalyst bed and this may be conveniently achieved, in portable breathing apparatus, by passing the gas over a bed of desiccant material.

Suitable material for use as desiccant beds include zeolites, silica gel and calcium sulphate. The desiccant material in the bed is suitably in the form of shaped particles, for example, cylinders or spheres. Zeolites are particularly useful since, in general, they can be used to form a bed of low air resistance.

It is also often desirable to firstly dry the gas before passing it over the catalyst bed since the catalyst may be susceptible to the influence of moisture in the gas with the result that its catalytic activity is wholly or partially lost.

The amount of catalyst required to effectively purify a contaminated breathable gas will depend on a number of factors, especially the flow rate of the gas through or over the catalyst bed, the concentration of carbon monoxide in the contaminated gas, the desired level of carbon monoxide in the contaminated gas, and the activity of the catalyst. As a guide it may be noted that the catalysts used in accordance with the invention typically have an activity of carbon monoxide removal, in the presence of excess oxygen, of about $16.2 \times 10^7$ mol.-sec$^{-1}$.g$^{-1}$ at 20° C.

In common with most catalyst systems, the catalysts employed in the invention may be poisoned by some materials, for example halogens, phosphorus, sulphur, arsenic and lead. Thus, it is particularly important, in the preparation of the catalysts, to employ substantially halide-free starting materials.

In order that the invention may be well understood, the following Examples are given by way of illustration only.

EXAMPLE 1

Catalysts containing a nominal 2 wt.% of palladium and platinum and a nominal 0.5 wt.% of nickel deposited on and within right circular cylindrical bodies of stannic oxide approximately 2 mm in diameter by 8 mm in length, were prepared as follows.

Commercially available, substantially chloride-free metastannic acid [$SnO_2.xH_2O$] was mixed with sufficient 20 vol.% nitric acid in a mixer to produce a material with a dough-like consistency. This was then extruded through an array of 2 mm diameter apertures in a vertical stainless steel plate and the cylindrical extrudate from each hole cut off when it had reached a length of about 8 mm. The resulting extrudates were collected and then dried in air for 18 hours at 40° C. Following this the temperature of the extrudates was raised to 300° C. over a period of 2 hours at a substantially uniform rate and then held at this value for 6 hours so as to calcine the extrudates in air.

The resulting calcined extrudates were next impregnated with 0.5 wt.% nickel by treatment with an aqueous solution of nickel nitrate hexahydrate[$ni(NO_3)_2 6H_2O$] in a rotary evaporator. The thus impregnated extrudates were then dried in air for 4 hours at 100° C., following which their temperature was raised to 300° C. over a period of 2 hours at a substantially uniform rate and then held at this value for a further 8 hours, so as to calcine the extrudates in air.

Next, the resulting calcined, nickel-containing extrudates were subjected to additional impregnation, drying and heating steps as just described except that the extrudates were now impregnated with about 2 wt.% each of platinum and palladium using aqueous solutions of tetrammine platinous hydroxide[$Pt(NH_3)_4(OH)_2$] and tetrammine palladium nitrate[$Pd(NH_3)_4(NO_3)_2$].

At this stage, the nickel, palladium and platinum were in the oxidised state and it was necessary to reduce them. This was done by immersing the pellets in a 10 vol.% solution of hydrazine hydrate[$NH_2NH_2H_2O$], leaving them immersed in the solution for 20–30 minutes and then oven drying them for 1 hour at 70° C. In this way, active catalyst pellets containing metallic palladium, platinum and nickel were produced.

The catalyst pellets prepared above were tested as follows.

Test 1

Air containing 0.25% by volume of carbon monooxide saturated with water at 37° C. was passed successively through a bed of a drier material (Zeolite 13X, 128 g, 205 ml) and a bed of the catalyst pellets (100 g, 50 ml) at a rate of 30 liters/minute. The content of carbon monoxide in the air issuing from the catalyst bed was measured at various times after the start of the test as were the temperatures of the drier and catalyst beds. The results are shown in Table 1.

TABLE 1

| Time from start of test (mins) | CO concentration in air from catalyst bed (% by vol.) | Catalyst bed temperature (°C.) | Drier bed temperature (°C.) |
|---|---|---|---|
| 0 | 0.25 | 35 | 35 |
| 1 | 0.0000 | 44.8 | 167 |
| 13 | 0.0000 | — | 167 |
| 21 | 0.0000 | 138 | — |
| 35 | 0.0000 | — | 59 |
| 37 | 0.0001 | — | 54 |
| 42 | 0.0002 | 90 | 47 |
| 67 | 0.0003 | 63 | — |
| 90 | 0.0004 | 61 | — |

The absorption of water by the drier bed is an exothermic reaction and the rise in temperature of the bed indicates that the bed is absorbing water, i.e. drying the air. Similarly the subsequent drop in temperature of the bed indicates that its water absorbing (drying) capacity is being exhausted.

Test 2

The procedure of test 1 was repeated except that the amount of catalyst was reduced to 50 g (Ca.25 ml). The results are shown in Table 2.

TABLE 2

| Time from start of test (mins) | CO concentration in air from catalyst bed (% by vol.) | Catalyst bed temperature (°C.) | Drier bed temperature) (°C.) |
|---|---|---|---|
| 0 | 0.25 | 37 | 37 |
| 2 | 0.0027 | 54 | 85 |
| 5 | 0.0005 | — | 135 |
| 7 | 0.0000 | — | 160 |
| 9 | 0.0000 | 110 | 167 |
| 17 | 0.0000 | 134 | 86 |
| 22 | 0.0000 | 124 | 86 |
| 39 | 0.0023 | 73 | 42 |
| 50 | 0.0045 | 65 | — |
| 70 | 0.0065 | 63 | — |
| 125 | 0.0100 | 60 | — |
| 235 | 0.0153 | 59 | — |

This test indicates that at higher flow rates of air per unit weight of catalyst, the effectiveness of the catalyst was slightly reduced as the drier ceased to effectively dry the air.

EXAMPLE 2

Catalyst pellets were prepared following the procedure described in Example 1 except that the platinum was replaced by the same amount of ruthenium (introduced in the form of ruthenium nitrosyl nitrate).

The pellets were tested following the procedure described in Test 1 above to give the results shown in Table 3.

TABLE 3

| Time from start of test (mins) | CO concentration of air from catalyst bed (% by vol.) | Catalyst bed temperature (°C.) | Drier bed (°C.) |
| --- | --- | --- | --- |
| 0 | 0.25 | 36 | — |
| 1 | 0.075 | 40.5 | 36.5 |
| 5 | 0.011 | 85 | 138 |
| 7 | 0.044 | 116 | 146 |
| 9 | 0.0034 | 133 | 147 |
| 18 | 0.0022 | 143 | 103 |
| 24 | 0.0028 | 136 | 58 |
| 30 | 0.0073 | 109 | 46 |
| 35 | 0.0188 | 83 | 43 |
| 40 | 0.0300 | 69 | 42 |
| 55 | 0.038 | 62 | — |
| 73 | 0.041 | 60 | — |
| 113 | 0.038 | 59.5 | — |
| 162 | 0.035 | 60.5 | — |

EXAMPLE 3

Catalyst containing a nominal 2 wt.% each of palladium and platinum and a nominal 0.5 wt.% of nickel deposited on and within right circular cylindrical bodies of stannic oxide approximately 2 mm in diameter by 8 mm in length, were prepared as follows.

Commercially available, substantially chloride-free metastannic acid [$SnO_2 \cdot xH_2O$] was mixed with sufficient 20 vol. % nitric acid containing nickel nitrate hexahydrate, tetrammine platinous hydroxide and tetramine palladous nitrate in a mixer to produce a material with a dough-like consistency and containing 2 wt.% each of palladium and platinum and 0.5 wt.% of nickel based on the weight of stannic oxide. This material was then extruded through an array of 2 mm diameter apertures in a vertical stainless steel plate and the cylindrical extrudate fron each hole cut off when it had reached a length iof about 8 mm. The resulting extrudates were collected and then dried in air for 18 hours at 40° C. Following this the temperature of the extrudates was raised to 300° C. over a period of 2 hours at a substantially uniform rate and then held at this value for 6 hours so as to calcine the extrudates in air.

At this stage, the nickel, palladium and platinum were in the oxidised state and it was necessary to reduce them. This was done by immersing the pellets in a 10% vol. solution of hydrazine hydrate [$NH_2H_2O$], leaving them immersed in the solution for 20–30 minutes and then oven drying them for 1 hour at 70° C. In this way, active catalyst pellets containing metallic palladium and nickel were produced.

The catalyst pellets were then tested as described in Test 1 to give the results shown in Table 4.

TABLE 4

| Time from start of test | CO concentration in catalyst bed (% by volume) | Catalyst bed temperature (%) | Drier temperature (°C.) |
| --- | --- | --- | --- |
| 0 | 0.25 | 38 | 38 |
| 1 | 0.46 | 54 | — |
| 5 | 0.015 | 70 | — |
| 7 | 0.15 | 70 | — |
| 10 | 0.0042 | 99 | — |
| 15 | 0.0016 | — | — |
| 15 | 0.0011 | 145 | — |
| 20 | 0.0015 | 144 | — |
| 25 | 0.0026 | — | — |
| 31 | 0.0070 | 111 | — |
| 35 | 0.0140 | 94 | 49 |
| 40 | 0.36 | 80 | — |
| 50 | 0.086 | 67 | — |
| 60 | 0.124 | 62 | — |
| 71 | 0.152 | — | 40 |
| 92 | 0.180 | 51 | — |
| 135 | 0.200 | 46 | — |

EXAMPLE 4

Catalyst pellets were prepared as described in Example 1 except that the nickel promoter was replaced by the same amount of manganese (introduced as manganous nitrate).

The resulting catalysts pellets were tested as described in Test 1 except that the amount of drier (Zeolite 13X) was 25.6 g (40 ml), and the airflow rate was 6 liters/minute.

The results are shown in Table 5.

TABLE 5

| Time from start of test (mins) | CO concentration in catalyst bed (% by volume) | Catalyst bed temperature (°C.) | Drier temperature (°C.) |
| --- | --- | --- | --- |
| 0 | 0.25 | 36 | 36 |
| 1 | 0.0002 | — | 40 |
| 4 | 0.0000 | 56 | — |
| 13 | 0.0000 | 106 | 139 |
| 45 | 0.0001 | 64.5 | — |
| 46 | 0.0002 | — | 41 |
| 51 | 0.0003 | 61 | — |
| 58 | 0.0004 | 59.5 | — |
| 74 | 0.0005 | 58.3 | — |
| 97 | 0.0006 | 58.2 | — |
| 113 | 0.0009 | 57.9 | — |
| 160 | 0.0010 | 57.5 | — |

We claim:

1. A method of reducing the carbon monoxide content of a carbon monoxide-contaminated breathable gas by bringing the contaminated gas into contact with a bed of catalyst, whereby to oxidise carbon monoxide in the gas to carbon dioxide, in which method the catalyst comprises a promoted tin IV oxide-supported precious metal catalyst, the promoter being one or more metals of group 1b, 3b, 7b and 8 of the Periodic Table and the precious metal being platinum, palladium, rhodium, iridium or ruthenium.

2. A method as claimed in claim 1 in which the promoter is copper, nickel, manganese, silver or lanthanum.

3. A method as claimed in claim 1 in which the catalyst contains from 0.1 to 5% by weight of promoter, based on the weight of tin IV oxide.

4. A method as claimed in claim 3 in which the catalyst contains from 0.1 to 2%, preferably from 0.3 to 0.8%, by weight of promoter, based on the weight of tin IV oxide.

5. A method as claimed in claim 4 in which the catalyst contains from 0.3 to 0.8% by weight of promoter, based on the weight of tin IV oxide.

6. A method as claimed in claim 1 in which the catalyst contains up to 5% by weight of each precious metal, to a total of from 1 to 10% by weight of precious metal, based on the weight of tin IV oxide.

7. A method as claimed in claim 6 in which the catalyst contains, as precious metals, platinum and/or palladium, each in an amount of from 0.5 to 5% by weight, based on the weight of tin IV oxide.

8. A method as claimed in claim 7 in which the precious metal component of the catalyst comprises a mixture of platinum and palladium in a total of from 3 to 5% by weight, based on the weight of tin IV oxide.

9. A method as claimed in claim 1 in which the contaminated gas contains moisture and is dried before being brought into contact with the catalyst.

* * * * *